Piezoelectric Polymer Antifouling Coating

Wooden et al.

[11] 4,283,461
[45] Aug. 11, 1981

[54] PIEZOELECTRIC POLYMER ANTIFOULING COATING

[75] Inventors: Bruce J. Wooden, Dickerson; Seymour Edelman, Silver Spring, both of Md.

[73] Assignee: The United States of America as represented by the Secretary of the Navy, Washington, D.C.

[21] Appl. No.: 44,130

[22] Filed: May 31, 1979

[51] Int. Cl.³ .............................................. B32B 27/00
[52] U.S. Cl. ........................... 428/422; 106/18.35; 114/222; 134/1; 252/62.9; 427/100
[58] Field of Search ............... 427/100; 252/62.9; 134/1, 4; 428/422; 260/255; 106/18.35; 114/222, 67 R, 67 A

[56] References Cited

U.S. PATENT DOCUMENTS

| 3,575,123 | 4/1971 | Shephard | 106/18.35 |
|---|---|---|---|
| 3,789,743 | 2/1974 | Murayama et al. | 29/568 |
| 3,832,580 | 8/1974 | Yamamuro et al. | 252/62.9 |
| 3,931,446 | 1/1976 | Murayama et al. | 427/100 |
| 4,095,996 | 6/1978 | Meyers | 134/1 |
| 4,170,185 | 10/1979 | Murphy | 114/67 R |

OTHER PUBLICATIONS

Report, "Use of Piezoelectric Polymers to Prevent Marine Fouling", by Latour et al., Oct. 25, 1978 or earlier.

*Primary Examiner*—Marion Mc Camish
*Assistant Examiner*—E. Rollins Buffalow
*Attorney, Agent, or Firm*—R. S. Sciascia; William T. Ellis; Kenneth E. Walden

[57] ABSTRACT

An antifouling coating for marine structures in the form of a film containing piezoelectric polymer material, which, when electrically activated vibrates at a selected frequency to present a surface interfacing with water which is inhospitable for attachment of vegetable and animal life including free-swimming organisms thereby discouraging their attachment and their subsequent growth thereon to the macrofoulant adult stage.

15 Claims, 4 Drawing Figures

PIEZOELECTRIC POLYMER ANTIFOULING COATING

The invention described herein may be manufactured and used by or for the Government of the United States of America for governmental purposes without the payment of any royalties thereon or therefor.

BACKGROUND OF THE INVENTION

This invention relates to the field of marine antifoulants. It is particularly directed to a coating for marine structures such as ship hulls, sonar domes, condensers, piping, buoys, and other objects submerged in saltwater which discourages attachment thereto of inorganic and organic aggregates, followed by bacteria or algae and barnacles.

The coating is in the form of a thin film containing a piezoelectric polymer, which, when electrically activated, vibrates at its interface with water containing these organisms over frequency ranges and amplitudes inhospitable to their attachment whereby subsequent foulant build-up is minimized.

The problems of marine fouling on ship hulls and marine structures by organisms present in saltwater are long standing. The application of lead and copper cladding on ship hulls was an early attempt to prevent barnacle formation. More recent attempts at solving the problem are made by the application of toxic paints and coatings containing chemicals, such as, for example, cuprous oxides, sometimes with the addition of mercurial and other compounds, which slowly leached into the water for poisoning waterborne microorganisms. Examples of these and other efforts are discussed in U.S. Pat. Nos. 3,167,473; 3,684,752; 3,979,354; 4,075,319; and 4,082,709.

It has been found that the attachment of organisms, in particular barnacles, on a marine surface follows a definite progression. It is thought that the surface is preconditioned by the collection of a film of marine slime. Because of physico-chemical forces of the surface, organic and inorganic aggregates adhere to it. These aggregates attract the bacteria and/or algae which will in a very short time colonize the surface. These bacteria are of the sliming type and thusly secrete mucoid-type compounds. These materials form bridges binding the organisms to the surface. Once the slimming is established, pioneer species of macrofouling groups settle on it. These could be barnacles, tubeworms, hydroids, bryozoans and others, depending on the geographical area and time of year. After this stage of the fouling sequence, many other organisms attach to complete the fouling community. In this community of foulants the organism larvae are living free swimming in water. This stage is of short duration, and the larvae soon seek a suitable place for settlement and attachment. If the place of settlement is inhospitable, the larvae swim away to try attachment at another location. The entire development from free-swimming larvae to young barnacles takes only about 72 hours. It is during this period that the present invention is most effective.

The resultant effect of a concentration of plants and animals settling and attaching themselves to ships are well known. They contribute significantly to increased skin frictional resistance of the hull with resulting speed reduction and increased fuel consumption. This problem of marine growth (fouling) applies not only to vessels but also to other submerged objects. For example, fouling of sonar domes has been found to seriously limit the active and passive modes of operation of ship's acoustical systems especially by generating noises. Fouling of moored data acquisition systems by marine organisms impedes operations and necessitates frequent maintenance. Buoys shift due to the excessive weight of fouling organisms. Wood pilings in berthing facilities undergo structural weakening and ultimate destruction due to marine borer and fungal attack. The fouling of piping, piping couplings and fittings in the sea water intake piping systems including condensers, leads to reduced flow rates, valve seat damage, and accelerated metal corrosion. Concrete or ferro-cement or other similar structures are also adversely affected.

SUMMARY OF THE INVENTION

This invention is directed to a coating for application to surfaces of a marine structure's interfacing with water such as ship hulls, sonar domes, and buoys to discourage attachment thereto of free-swimming organisms (including cypris larvae) at their attaching stage, thus preventing their eventual growth thereon to their full size. The coating disclosed in the invention is in the form of a thin film including a piezoelectric polymer secured to the water side of a marine structure. When an electrical signal, usually in the form of an alternating current, is applied through electrodes on opposite faces of the polymer there is induced vibration of the film at its water interface to present a surface inhospitable to the attachment of marine organisms.

Therefore, it is an object of this invention to disclose a coating for covering a marine structure to discourage the initial attachment of marine foulants.

It is another object of this invention to disclose a coating containing a piezoelectric polymer material, which, upon electrical activation, vibrates to present a surface in interface with water which marine microorganisms find inhospitable for attaching, thus preventing subsequent marine growth to macrofoulants.

The invention will become apparent upon considering the contents of the accompanying specification and drawings.

DESCRIPTION OF THE PREFERRED EMBODIMENT

The present invention provides a novel arrangement of preventing foulant formation on marine structures, e.g. barnacles, by discouraging initial attachment of free-swimming larvae and spores during their relatively short settling stage. The surface of a marine structure such as a ship hull, buoy or sonar dome is made inhospitable for their attachment by applying a coating to the surface in the form of a thin film of piezoelectric polymer to which a current is applied in a manner for causing vibrations at the water interface.

Figure 1:
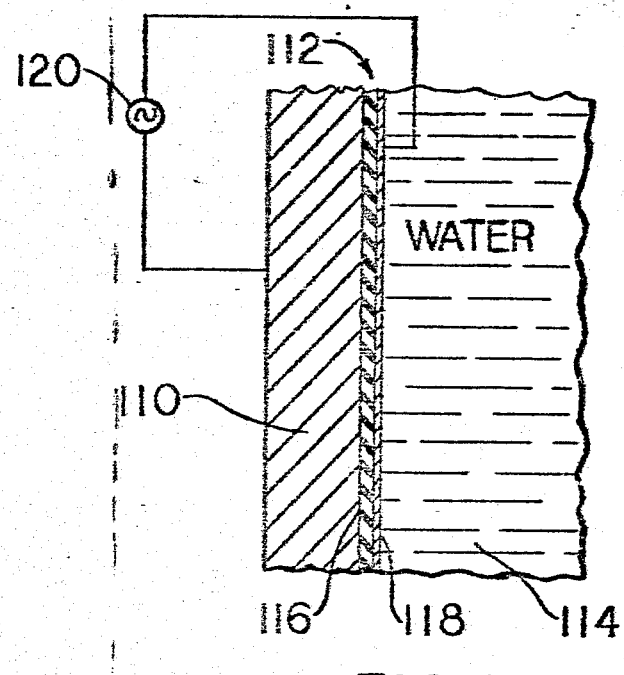
FIG. 1 is a cross-sectional view taken through a wall of a marine structure showing the antifouling coating in position thereon interfacing with water containing microorganisms.

Several variations of the invention are shown in FIGS. 1-4 of the drawing. In FIG. 1 for example, there is shown in cross-section a ship's plate or other marine structure 110 to which a coating or film 112, according to one form of the invention, is attached in facing relationship with water 114 containing organisms at a stage in life ready for attachment to a surface. Coating 112 is comprised of a piezoelectric polymer such as a poly(vinylidene fluoride) in the form of a thin sheet or film adhered to the surface of structure 110 and in electrical contact therewith. Other piezoelectric polymeric materials such as polyvinyl fluoride or cellulose acetate butrate, for example, may be used in the coating.

An electrode 118, in the form of a continuous conductive sheet or discontinuous finger-like grid, is disposed on the outer surface of the polymer and may be protected from water 114 by a thin film of nonconducting material (not shown). An alternating current of selected frequency is applied from source 120 across electrode 118 and structure 110, which acts as an electrode, for activating the piezoelectric material therebetween for causing it to vibrate the film at a resonant frequency in a direction substantially normal to the water interface. Because there are four to five hundred kind or species of barnacles in the world the frequency which must be employed ranges from around 100 Hz (even as low as 10 Hz) to several hundred megahertz. A sweep frequency may also be employed as no single frequency alone will be effective against all species. It may be found that for one specie a low frequency and high amplitude is most effective while others react to a high frequency low amplitude. The wave form of the signal applied is preferably a peaked nonsinusoidal wave wherein there is a quick reversal in direction at its peak voltage which tends to cause the coating to flick in a manner for throwing off would be attaching bodies. The vibrations must occur from the very beginning and be operative all of the time fouling could occur. If this is not done, the surface may vibrate totally different than intended. Sliming or remains of hard-shelled foulants attached to the surface may change the nature of the intended vibrations which may diminish the process or render it useless altogether. For example, free swimming barnacle-forming larvae present in the water find the vibrating surface inhospitable for attachment, hence they dislodge to try another surface. By this arrangement an essential initial step in barnacle formation is interrupted.

Figure 2:
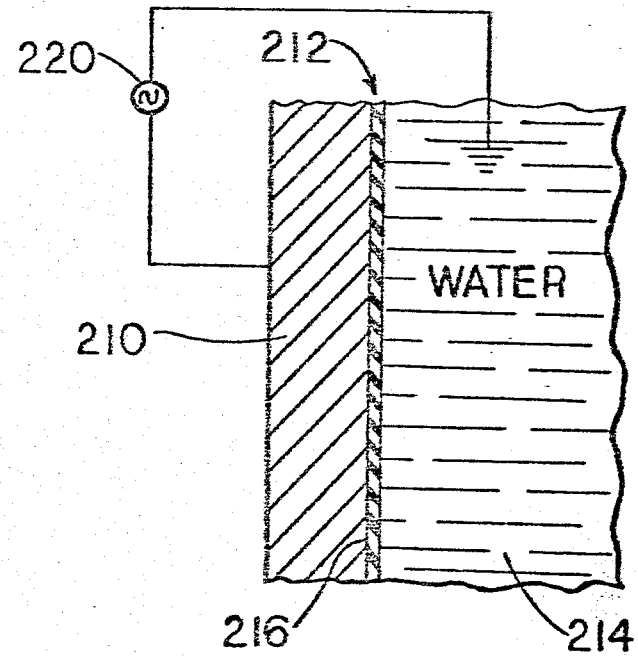
FIG. 2 is a cross-sectional view of a first alternate embodiment of the invention.

In the first alternate embodiment of the invention shown in FIG. 2, there is illustrated a coating or film 212 of piezoelectric polymer 216 secured to the surface of structure 210 and interfacing with water 214. The polymer is activated by a current supplied from source 220 across structure 210 and water 214, which defines an outer electrode. The polymer is caused to vibrate in much the same manner as in FIG. 1 for discouraging barnacle larvae attachment on its surface.

Figure 3:
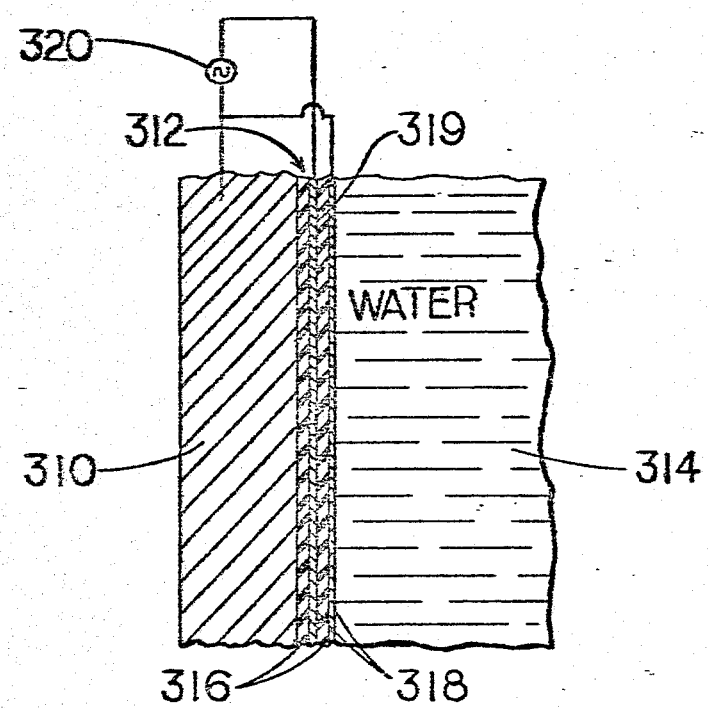
FIG. 3 is a cross-sectional view of a second alternate embodiment of the invention.

The embodiment shown in FIG. 3, illustrates plural laminated sheets of polarized piezoelectric polymer 316 sandwiched between plural conductive sheets or electrodes 318 and structure 310, which also acts as an electrode, to define a layered coating or film designated generally by numeral 312. One lead from signal source 320 is connected to one electrode 318 and the other lead is connected to both the other electrode 318 and structure 310 for activating the piezoelectric polymer material in layers 316. As mentioned in reference to FIG. 1, the outer of electrodes 318 may be covered with a nonconductive film at its water interface (not shown).

Figure 4:
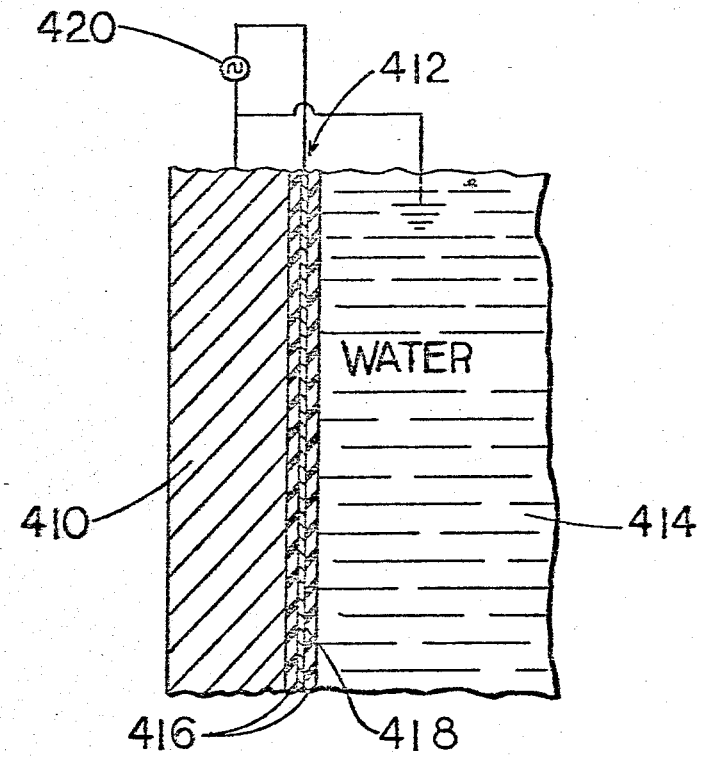
FIG. 4 is a cross-sectional view of a third alternate embodiment of the invention.

The FIG. 4 embodiment comprises features from the embodiments of both FIGS. 2 and 3. There is shown a coating or film 412 comprised of two layers 416 of piezoelectric polymer on either side of a common conductor sheet or electrode 418. The inner of layers 416 is secured in physical and electrical contact with structure 410 while the outer of layers 416 interfaces with water 414. Signal generator 420 supplies an alternating current between electrode 418 and structure 410 on one side and water 414 on the other side for activating layers 416 for causing them to vibrate at a frequency at the water interface to discourage barnacle larvae attachment.

In each of the embodiments the ship's hull or structure receives one of the leads from the signal source and serves as one of the electrodes in cooperation with outwardly disposed electrode(s) for activating the sandwiched polymer layer. It may be advantageous to let the coated surface be subdivided into tracts each connected in parallel with its own potential separate from one another whereby a short circuit on one will not disrupt all.

There has been described herein coatings comprised of thin films of piezoelectric polymer, disposed in single or plural layers, against a marine structure wherein electrical activation causes vibrations thereof in interface with water for discouraging organism attachment.

While four embodiments of the invention have been disclosed for carrying out its objectives, it is obvious that further embodiments and modifications may be made without departing from the spirit of the invention which is limited only by the scope of the claims herein.

What is claimed is:
1. A coating for reducing fouling on marine structures comprising:
   a film containing piezoelectric polymer secured over substantially the entire surface of the marine structure and separating said surface from water which contains animal and vegetable fouling organisms;
   said film having one of its sides in electrical contact with the surface of the marine structure and its other side in electrical contact with the water with which it interfaces;
   an electrical power source applying alternating signal across the film;
   said alternating signal having a wave form with a quick reversal of direction at its peak thereby causing the film to flick sharply at the film surface for throwing off attaching organisms.
2. The invention according to claim 1 wherein a sheet of electrically conductive material covers the other side of the film in contact with the water.
3. The invention according to claim 2 wherein the signal is applied to the sheet.
4. The invention according to claims 1, 2 or 3 in which the signal is applied at a sweep frequency ranging from as low as 10 hertz to as high as several hundred megahertz.
5. A coating for a marine structure for reducing marine fouling thereon comprising:
   a film containing piezoelectric polymer secured over substantially the entire surface of the marine structure separating said surface from water which contains barnacle forming larvae at their attaching stage in life;
   said film comprising plural layers of piezoelectric polymer and an electrically conductive sheet sand- wiched between the layers defining a common electrode therefore;

said film having one side in electrical contact with the surface of the marine structure to which it is secured and its other side in electrical contact with the water;

a power source applying an alternating signal between the common electrode and both the marine structure surface and other side of the film for electrically activating the piezoelectric polymer layers therebetween for causing vibration of the film at frequencies which the larvae find inhospitable for attachment.

6. The invention according to claim 5 wherein the film comprises plural common electrodes sandwiched between said plural piezoelectric polymer layers.

7. The invention according to claim 5 wherein the signal applied to the other side of the film is applied through the water.

8. The invention according to claim 5 wherein an electrically conductive sheet covers at least a substantial portion of the other side of the film.

9. The invention according to claim 8 wherein the signal is applied to the electrically conductive sheet.

10. The invention according to claims 5, 6, 7, 8, or 9 wherein the alternating signal is applied at a sweep frequency ranging from as low as ten hertz to as high as several hundred megahertz for effecting many kinds of larvae.

11. The invention according to claims 5, 6, 7, 8 or 9 wherein the alternating signal has a wave form with a quick reversal of direction at its peak thereby causing the film to flick sharply in a manner for increasing inhospitality of the film by throwing off attaching larvae.

12. A coating for a marine structure for reducing marine fouling thereon comprising:

a film containing piezoelectric polymer secured over the marine structure separating its surface from water which contains barnacle forming larvae at their attaching stage in life;

said film comprising plural layers of piezoelectric polymer and an electrically conductive sheet sandwiched between the layers defining a common electrode therefore;

said film having one side in electrical contact with the surface of the marine structure to which it is secured and its other side in electrical contact with the water;

a power source applying an alternating signal between the common electrode and both the marine structure surface and other side of the film for electrically activating the piezoelectric polymer layers therebetween for causing vibration of the film at frequencies which the larvae find inhospitable for attachment;

said signal further having a wave form with a quick reversal of direction at its peak for causing the film to flick sharply for increasing inhospitality of the film by throwing off would be attaching larvae.

13. The invention according to claim 12 wherein the alternating signal is applied at sweep frequencies at ranges from as low as ten hertz to as high as several hundred megahertz for effecting many kinds of larvae.

14. The invention according to claim 12 or 13 wherein an electrically conductive sheet covers at least a substantial portion of the other side of the film.

15. The invention according to claim 14 wherein the signal applied to the other side of the film is applied through the electrically conductive sheet.

* * * * *